(12) United States Patent
Benner

(10) Patent No.: US 8,937,726 B2
(45) Date of Patent: Jan. 20, 2015

(54) ROTARY POSITION MEASURING INSTRUMENT

(75) Inventor: Ulrich Benner, Trostberg (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 176 days.

(21) Appl. No.: 13/603,846

(22) Filed: Sep. 5, 2012

(65) Prior Publication Data

US 2013/0063732 A1 Mar. 14, 2013

(30) Foreign Application Priority Data

Sep. 13, 2011 (DE) .......................... 10 2011 082 570

(51) Int. Cl.
*G01B 11/14* (2006.01)
*G01D 5/38* (2006.01)

(52) U.S. Cl.
CPC ...................................... *G01D 5/38* (2013.01)
USPC .......................................................... 356/614

(58) Field of Classification Search
CPC ....... G01C 5/38; G01D 5/3473; G01D 5/347; G01D 5/34746
USPC ......................................... 356/614, 498–499
See application file for complete search history.

(56) References Cited

U.S. PATENT DOCUMENTS

| 4,572,952 A | * | 2/1986 | March ........................ 250/237 G |
| 4,844,617 A | * | 7/1989 | Kelderman et al. ............ 356/624 |
| 5,379,132 A | * | 1/1995 | Kuwayama et al. ............ 359/13 |
| 6,429,940 B1 | * | 8/2002 | Willhelm ....................... 356/499 |
| 6,885,457 B1 | * | 4/2005 | Michel et al. .................. 356/499 |
| 2004/0090637 A1 | * | 5/2004 | Holzapfel et al. ............. 356/499 |
| 2007/0262250 A1 | * | 11/2007 | Benner ..................... 250/231.13 |
| 2011/0109917 A1 | * | 5/2011 | Benner ......................... 356/614 |
| 2011/0286004 A1 | * | 11/2011 | Holzapfel et al. ............. 356/499 |

FOREIGN PATENT DOCUMENTS

JP 9-133552 A 5/1997
WO WO 2009144057 A1 * 12/2009

OTHER PUBLICATIONS

Pettigrew, R.M., "Analysis of Grating Imaging and its Application to Displacement Meteorology," SPIE, vol. 36, $1^{st}$ European Congress on Optics Applied to Meteorology (1977), pp. 325-332.

* cited by examiner

*Primary Examiner* — Kara E Geisel
*Assistant Examiner* — Dominic J Bologna
(74) *Attorney, Agent, or Firm* — Brinks, Gilson & Lione

(57) ABSTRACT

A rotary position measuring instrument that includes a light source and a graduated disk having a measuring standard. The rotary position measuring instrument including an optoelectronic detector assembly, wherein the graduated disk is rotatable relative to the light source and the detector assembly about an axis of rotation, wherein rotary-angle-dependent position signals are detectable via the detector assembly. The light source is spaced apart from the measuring standard by a first distance, and the detector assembly is disposed at a second distance from the measuring standard, wherein the second distance is different than the first distance. The graduated disk includes an optical element, which has an optical effect that results in a projecting an image of the light source into a position which has a third distance from the measuring standard, wherein the third distance is different than the first distance.

10 Claims, 4 Drawing Sheets

ROTARY POSITION MEASURING INSTRUMENT

RELATED APPLICATIONS

Applicant claims, under 35 U.S.C. §119, the benefit of priority of the filing date of Sep. 13, 2011 of a German patent application, copy attached, Serial Number 10 2011 082 570.3, filed on the aforementioned date, the entire contents of which is incorporated herein by reference.

BACKGROUND

1. Technical Field

The present invention relates to a rotary position measuring instrument.

2. Background Information

FIG. 1 shows a schematic fragmentary view of a known optical position measuring instrument that is based on a central-projection scanning principle. A light source 1 divergently illuminates a reflective measuring standard 2. The measuring standard can be embodied as either a linear or a rotary graduation, depending on whether the position measuring instrument is to be used for detecting rotary or linear relative motions. From the measuring standard 2, incident beams are reflected back in the direction of the light source 1. In a detection plane, the incident beams strike an optoelectronic detector assembly 3. The measuring standard 2 is movably disposed relative to the light source 1 and the detector assembly 3. In other words, the measuring standard 2 is either displaceable along a linear axis or rotatable about an axis of rotation. In the case of the relative motion of the measuring standard 2 relative to the light source 1 and the detector assembly 3, the result in the detection plane is a modulated fringe pattern, which can be converted, via the detector assembly 3, into motion-dependent position signals.

With the aid of a position measuring instrument of this kind, the relative or absolute position of two objects movable (linearly or rotationally) relative to one another can be determined. One of the two objects is connected to the measuring standard 2, and the other object is connected to the light source 1 and the detector assembly 3.

As can be seen from FIG. 1, the light source 1 is spaced apart from the measuring standard 2 at a distance u that will hereinafter be called the first distance. The detector assembly 3 is spaced apart from the measuring standard 2 by a distance v, which will hereinafter be called the second distance. In FIG. 1, the second distance v is different in magnitude from the first distance u.

In terms of a model, the scanning beam path described can also be viewed such that instead of the real light source 1 at the distance u from the measuring standard 2, a virtual light source 1' at a distance u', wherein |u'|=|u|, illuminates the measuring standard 2 from the other side. The beams emitted by the virtual light source 1' effect a central projection of the scanned graduation of the measuring standard 2 into the detection plane.

Rotary position measuring instruments based on an optical central-projection scanning principle are known, for instance from Japanese patent disclosure JP 9-133552 A. That position measuring instrument includes a light source, a graduated disk with a rotationally symmetrical, reflective measuring standard, and an optoelectronic detector assembly. The graduated disk is rotatable relative to the light source and the detector assembly about an axis of rotation, so that in the event of the relative rotation, rotary-angle-dependent position signals are detectable via the detector assembly.

The central-projection scanning principle employed for generating the position signals is also known as a three-grating scanning principle; information on which can be found for instance in the publication by R. Pettigrew entitled "Analysis of Grating Imaging and its Application to Displacement Meteorology", in SPIE, Vol. 36, $1^{st}$ European Congress on Optics Applied to Meteorology (1977), pp. 325-333.

In the ideal case, in such a central-projection scanning principle the magnitudes of the first distance u and the second distance v are selected to be identical. To that end, the corresponding components of the position measuring instrument should be suitably placed in the scanning beam path. With identically selected distances u, v, any changes in the distance between the objects, or between the measuring standard 2 and the light source 1/detector assembly 3, that is, in the scanning distance, do not have an effect on the size of the fringe pattern that results in the detection plane. In practice, however, it is not always ensured that the first and second distances u, v are identical. That is, often a situation like that shown in FIG. 1 results in which the magnitude of the first distance u is different from the magnitude of the second distance v. In the example of FIG. 1, wherein u<v, fluctuations in the scanning distance cause changes in the size of the fringe pattern and, thus, cause errors in the position determination.

Further problems in such position measuring instruments result from their sensitivity to soiling on the measuring standard.

OBJECTS AND SUMMARY OF THE INVENTION

It is an object of the present invention to make rotary position measuring instruments based on the central-projection scanning principle less sensitive to non-ideal distances between individual components in the scanning beam path and/or to ensure greater insensitivity to soiling of the measuring standard being scanned.

This object is attained according to the present invention by a rotary position measuring instrument that includes a light source and a graduated disk having a rotationally symmetrical, reflective measuring standard. The rotary position measuring instrument further including an optoelectronic detector assembly, wherein the graduated disk is rotatable relative to the light source and the detector assembly about an axis of rotation, wherein in case of relative rotation, rotary-angle-dependent position signals are detectable via the detector assembly. The light source is spaced apart from the measuring standard on the axis of rotation by a first distance, and the detector assembly is disposed at a second distance from the measuring standard, wherein the second distance is different in magnitude than the first distance. In addition, the graduated disk includes an optical element, which has an optical effect that results in a projecting an image of the light source into a position which has a third distance from the measuring standard, wherein the third distance is different in magnitude than the first distance.

The rotary position measuring instrument according to the present invention includes a light source, a graduated disk with a rotationally symmetrical, reflective measuring standard, and an optoelectronic detector assembly. The graduated disk is rotatable relative to the light source and the detector assembly about an axis of rotation, so that in the event of relative rotation, rotary-angle-dependent position signals are detectable via the detector assembly. The light source is spaced apart on the axis of rotation by a first distance from the measuring standard. The detector assembly is disposed at a second distance from the measuring standard that has a magnitude different from the first distance. The graduated disk includes an optical element, which has an optical effect such that the result is a projection of an image of the light source into a position which has a third distance from the measuring standard, and the third distance differs in magnitude from the first distance.

It is possible here that the third distance is selected to be identical in magnitude to the second distance.

In one embodiment of the rotary position measuring instrument of the present invention, it can be provided that the optical element on the graduated disk has an optical effect which is equivalent to the optical effect of a concave mirror having a defined focal length.

Via the optical element on the graduated disk, a real projection of an image of the light source can result at a position such that the beams emitted from this position first pass through the detector assembly, strike the measuring standard, and after the reflection that results there the beams are propagated convergently in the direction of the detector assembly.

In a further embodiment, it can be provided that the optical elements on the graduated disk have an optical effect, which is equivalent to the optical effect of a convex mirror having a defined focal length.

It is also possible that the measuring standard is embodied as a radial graduation, which includes circular-annularly disposed graduation regions that have different reflection properties.

Moreover, more highly reflective graduation regions on the graduated disk are embodied such that the result thereby is the optical effect on the incident beams.

It is also possible that the optical element is embodied as rotationally symmetrical graduated structures on the carrier substrate of the graduated disk.

In a preferred embodiment of the rotary position measuring instrument of the present invention, the light source fully illuminates the measuring standard without interposed optical components.

Moreover, the detector assembly can include a circular-annular detector array, which includes a plurality of detector elements disposed circular-annularly around the axis of rotation.

In certain variant embodiments, a particular advantage is greater insensitivity to changes in the distance of components in the scanning beam path. As a result, even when there are deviations from the ideal desired distances, as can be caused for instance by incorrect mounting of the position measuring instrument, the signal quality of the position signals is satisfactory.

Another advantage is that in some possible variant embodiments, because of the convergent beam path between the measuring standard and the detector assembly, markedly smaller detector surfaces in the detector assembly are sufficient for generating rotary-angle-dependent position signals. As a consequence of this beam path, there is also greater insensitivity to possible soiling of the measuring standard, since in contrast to the otherwise conventional divergent beam path, the area scanned on the measuring standard is larger than the area projected onto the detector assembly.

Further advantages and details of the present invention will be found in the ensuing description of exemplary embodiments in conjunction with the drawings.

In the drawings:

BRIEF DESCRIPTION OF THE DRAWINGS

FIG. 4b is a sectional view of a portion of the graduated disk of FIG. 4a; and

DETAILED DESCRIPTION OF THE PREFERRED EMBODIMENTS

Figure 1:
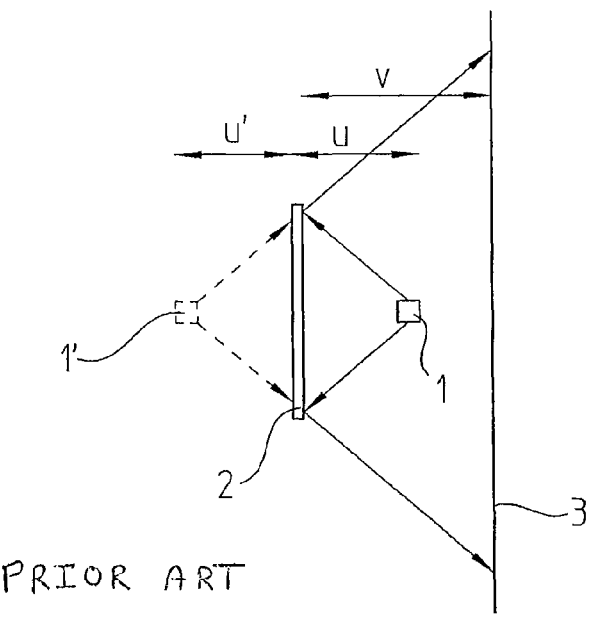
FIG. 1 schematically shows a known optical position measuring instrument.
Figure 2:
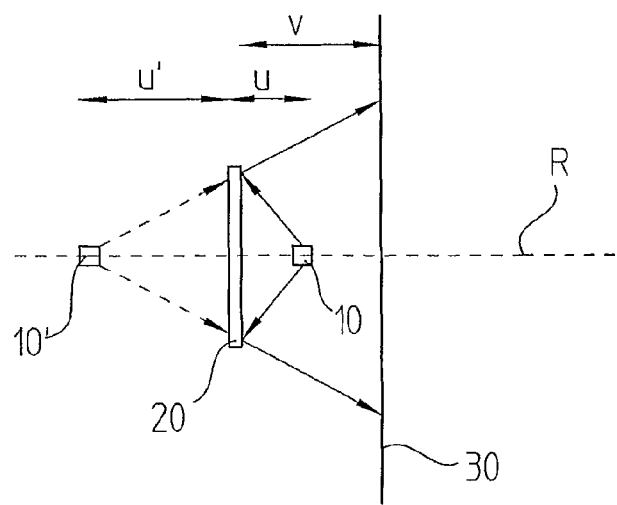
FIG. 2 shows a schematic fragmentary view of a first exemplary embodiment of a rotary position measuring instrument in accordance with the present invention.

In a schematic fragmentary view analogous to FIG. 1, FIG. 2 shows a first exemplary embodiment of a rotary position measuring instrument of the present invention, which is based on a central-projection scanning principle.

In the exemplary embodiment of the rotary position measuring instrument shown in FIG. 2, a light source 10 is provided, which divergently illuminates a graduated disk that has a rotationally symmetrical, reflective measuring standard 20. Between the light source 10 and the measuring standard 20, no further interposed components are provided, which makes an especially compact design of the rotary position measuring instrument of the present invention possible. The measuring standard 20 on the graduated disk is embodied as a radial graduation, which includes graduation regions of different reflection properties disposed in a circle around the axis of rotation R. As the measuring standard 20, either an incremental graduation with periodically disposed graduation regions of different reflectivity, or an absolute graduation with aperiodically disposed graduation regions of different periodicity may be provided. From the rotationally symmetrical, fully illuminated measuring standard 20, the incident beams are reflected back in the direction of the light source 10, and in the detection plane the incident beams strike the rotationally symmetrical optoelectronic detector assembly 30. The graduated disk having the measuring standard 20 is rotatable relative to the light source 10 and the detector assembly 30 about the axis of rotation R. In the event of relative rotation of the graduated disk having the measuring standard 20 relative to the light source 10 and the detector assembly 30, the result in the detection plane is a circular-annular, modulated fringe pattern, which can be converted via the detector assembly 30 into rotary-angle-dependent position signals.

With the aid of such a rotary position measuring instrument, the relative or absolute position of two objects rotatable relative to one another about the axis of rotation R can be determined. One of the two objects here is connected to the graduated disk or measuring standard 20, and the other object is connected to the light source 10 and the detector assembly 30. The two objects can, for instance, be machine parts that are rotatable relative to one another. The position signals generated via the position measuring instrument can be delivered to a machine controller, which uses them, for instance, for positioning the appropriate machine parts.

As can be seen from FIG. 2, the light source 10 is spaced apart on the axis of rotation R from the measuring standard 20 by the first distance u. The detector assembly 30 is spaced apart from the measuring standard 20 by the second distance v. The magnitude of the second distance v is selected to be different from the first distance u.

According to the present invention, it is now provided that an optical element effects a projection of an image of the light source 10 into a position on the axis of rotation R, which has a third distance u' from the measuring standard 20 is provided in or integrated with the graduated disk; this third distance u' differs in magnitude from the first distance u. In FIG. 2, the light source projected into this position, that is, the light source image, is identified by reference numeral 10', and the beam path resulting from this image is indicated by dashed lines. In the exemplary embodiment shown, the corresponding optical element in the graduated disk has been dimensioned such that the magnitude of the third distance u' is identical to that of the second distance v. As will be explained hereinafter, however, the selection of the magnitude of the third distance u' to be identical to the second distance v is in no way essential to the present invention. That is, advantageous embodiments of the rotary position measuring instrument of the present invention can also be implemented with differently selected third distances u'.

The optical element integrated with the graduated disk here has the optical effect of either a concave mirror or a convex mirror, each with a defined focal length f. In the example of FIG. 2, via the corresponding optical element on the graduated disk, the result is the optical effect of a concave mirror, and the focal length f is quantitatively larger than the object distance in the projection of an image by the concave mirror. As a result, the light source 10 is projected into the virtual light source 10' at a position on the axis of rotation R that is at the third distance u' from the measuring standard 20.

It will now be explained how, for the present example, the requisite focal length f of the concave mirror, or an equivalent in the graduated disk, which is required for generating the virtual light source 10' at the third distance u', is ascertained.

Thus, in the arrangement shown, an image reproduction scale $m_{1,2}$, at given first and second distances u, v, is determined in accordance with the following equation:

$$m_{1,2} = u/(2v) \pm \mathrm{Sqrt}((u/(2v))^2 - 1) \quad \text{(Equation 1)}$$

The requisite magnitude of the third distance u' results then from Equation 2 as follows:

$$u' = m_{1,2} \cdot u \quad \text{(Equation 2)}$$

The requisite focal length f for the concave mirror can then be ascertained from Equation 3:

$$1/u + 1/u' = 1/f \quad \text{(Equation 3)}$$

By way of the appropriate optical element in the graduated disk, the optical effect of a concave mirror with the thus-determined focal length f must accordingly be ensured, so that a virtual projection of an image of the light source 10 into the desired position takes place, as shown.

Figure 3A:
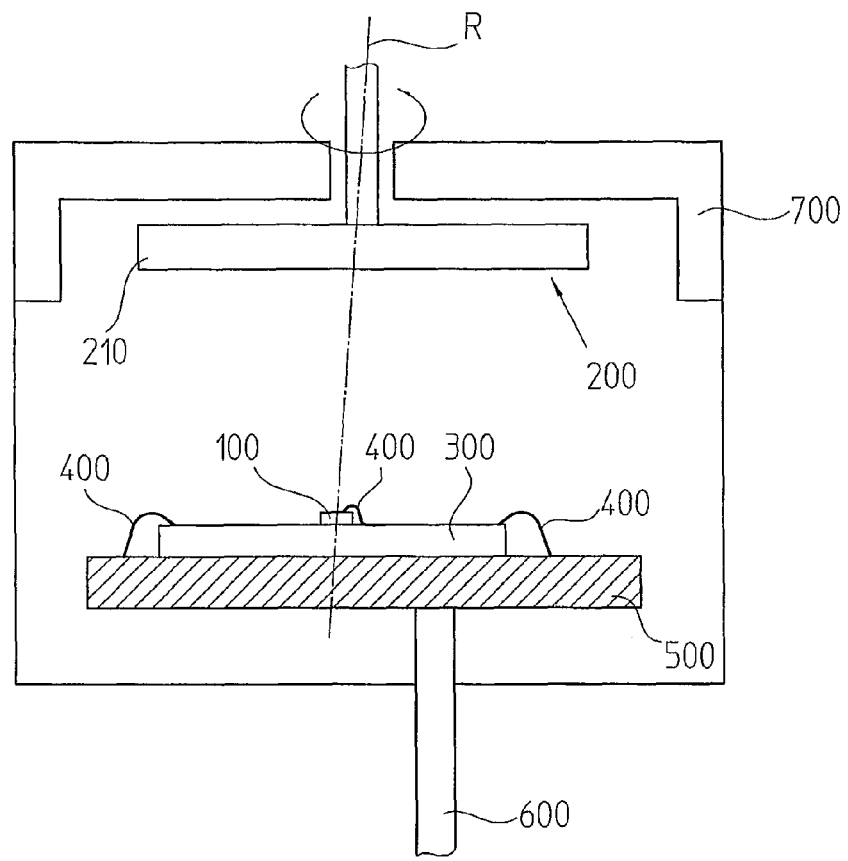
FIG. 3a shows a lateral fragmentary view of the rotary position measuring instrument of FIG. 2.
Figure 3B:
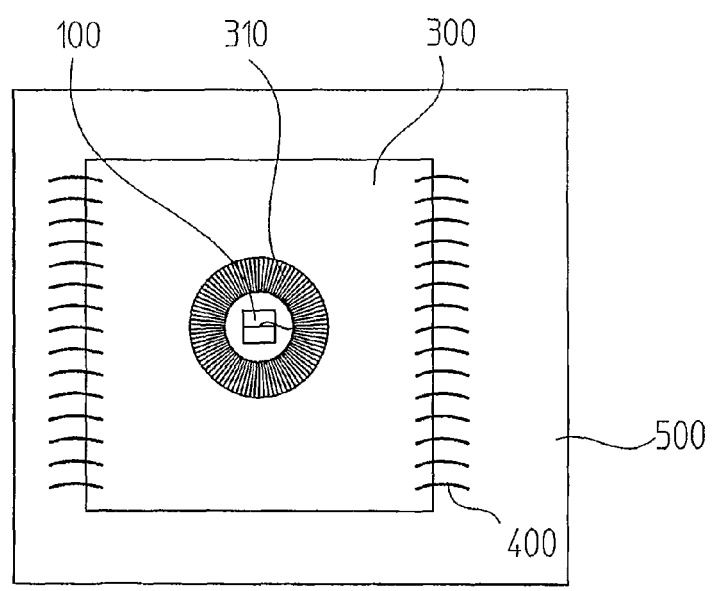
FIG. 3b is a top view of an embodiment of a detector assembly used with the rotary position measuring instrument of FIG. 2 in accordance with the present invention.
Figure 4A:
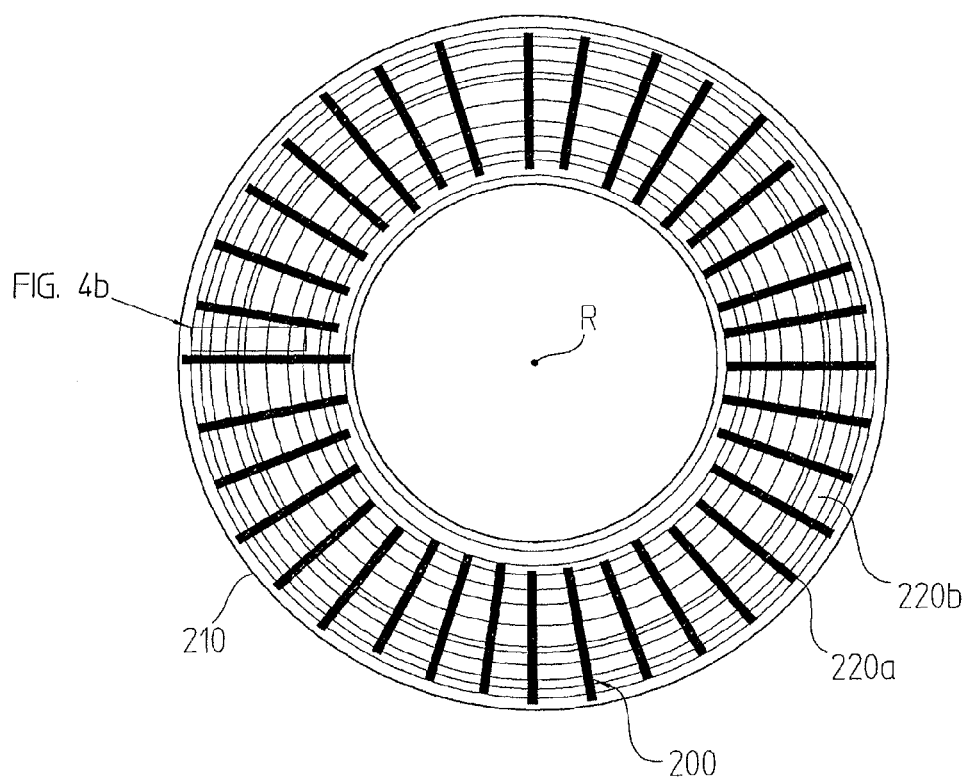
FIG. 4a is a top view of an embodiment of a graduated disk used with the rotary position measuring instrument of FIG. 2 in accordance with the present invention.
Figure 4B:

A concrete design of the first exemplary embodiment of the rotary position measuring instrument of the present invention in FIG. 2 will now be explained below in conjunction with FIGS. 3a, 3b and 4a, 4b. FIGS. 3a, 3b here show various fragmentary views of a complete position measuring instrument. FIGS. 4a, 4b shown various views of the graduated disk, including the measuring standard, used in it.

In a housing 700 of the position measuring instrument, a detector assembly 300 is disposed on a stationary carrier board 500. A light source 100 is placed centrally above the detector assembly 300. The detector assembly 300 and the light source 100 are connected via bond wires 400 to signal lines—not shown in the drawings—in the carrier board 500. Via a cable 600, the carrier board 500 is connected to a downstream electronics unit, also not shown, by way of which the position signals generated are transmitted and also by way of which the supply of current and voltage to the electronic components in the position measuring instrument is effected.

As seen particularly in FIG. 3b, the detector assembly 300 includes a circular-annular detector array 310. The detector array 310 includes a plurality of individual detector elements disposed in a circular ring and periodically about the axis of rotation R.

In the housing 700, the graduated disk 210 is disposed rotatably about the axis of rotation R. The graduated disk 210, on the side toward the detector assembly 300, has a reflective measuring standard 200. An optical element integrated with the graduated disk 210 is provided, which has the optical effect described above, namely of projecting an image of the light source 100 at a position which has a third distance u' from the measuring standard 200. In the present concrete exemplary embodiment, the optical element is embodied in the graduated disk 210 such that it has an optical effect like a concave mirror, as in the example of FIG. 2, wherein the resultant third distance u' is identical in magnitude to the second distance v.

A top view on the graduated disk 210 in this exemplary embodiment is shown in FIG. 4a, and a fragmentary cross-sectional view of the graduated disk 210 is shown in FIG. 4b. As seen from FIG. 4a, on the graduated disk 210 on a carrier substrate, which may include glass, metal, or plastic, for example, there is a reflective measuring standard 200, in the form of an incremental radial graduation which includes graduation regions 220a, 220b with different reflection properties that are disposed in a circular ring about the axis of rotation R. In the example shown, the graduation regions 220a of the measuring standard 200, which are shown dark in FIG. 4a, have a lesser reflectivity than the graduation regions 220b located between them. Alternatively, it would also be possible to embody these graduation regions 220a such that the light reflected from them does not reach the detector assembly. The concentric circles on the graduated disk 210 that are visible in FIG. 4a represent the boundaries of rotationally symmetrical structures or radial graduated structures in the more highly reflective graduation regions 220b, which in the marked portion are shown in detail in FIG. 4b. In the present exemplary embodiment, the optical element which affects the defined projection of the image of the light source 100 is embodied via the radial graduated structures in the graduated disk 210. By the concrete embodiment of the graduated structures, that is, the targeted selection of the graduation height and width and the concentricity of the rotationally symmetrical graduated structures, the graduated disk 210 becomes a diffractive concave mirror with a defined focal length, by way of which the projection of the image of the light source 100 takes places, as explained. The selection of the relevant parameters of the graduated structures is based here on the known principle for designing diffractive elements for point-to-point image projection.

The production of a graduated disk 210 with a measuring standard 200 embodied in this way can be done, for example, first by creating the rotationally symmetrical graduated structure by depositing suitable films on a reflective carrier substrate and structuring them lithographically. Next, over the graduated structures the only slightly reflective graduation regions of the radial graduation are applied, for instance by depositing suitably absorbent materials.

Alternatively to this, it would also be possible to embody the graduated disk 210 by way of techniques known, for instance from the production of CDs. Then, in the only slightly reflective graduation regions, a diffractive fine structure is applied, which ensures that the light striking it does not reach the detector assembly, but instead is diffracted into other directions in space. Both these fine structures and the rotationally symmetrical graduated structures could first be molded in transparent plastic, for example, and then provided with a highly reflective metal film for instance of aluminum or gold.

Instead of embodying the optical effects in the graduated disk as a concave mirror, in this embodiment of the rotary position measuring instrument of the present invention it could also be provided that an optical effect equivalent to a convex mirror can be attained via suitable graduated structures in the graduated disk. In this case, the focal length of the convex mirror is selected to be quantitatively greater than the object distance in the projection of an image by the convex mirror.

Finally, a further exemplary embodiment of the rotary position measuring instrument of the present invention will be explained in conjunction with FIG. 5. This drawing, analogous to FIG. 2, shows the scanning beam path of this exemplary embodiment in highly schematic form.

Once again, a light source 1000 is provided, which is located next to the measuring standard 2000 at a first distance u away from it on the axis of rotation R. Analogous to the first exemplary embodiment of FIG. 3, the detector assembly 3000 is spaced apart by the second distance v from the measuring standard 2000. As above, the measuring standard 2000 is embodied as a reflective measuring standard in the form of a radial graduation.

Figure 5:
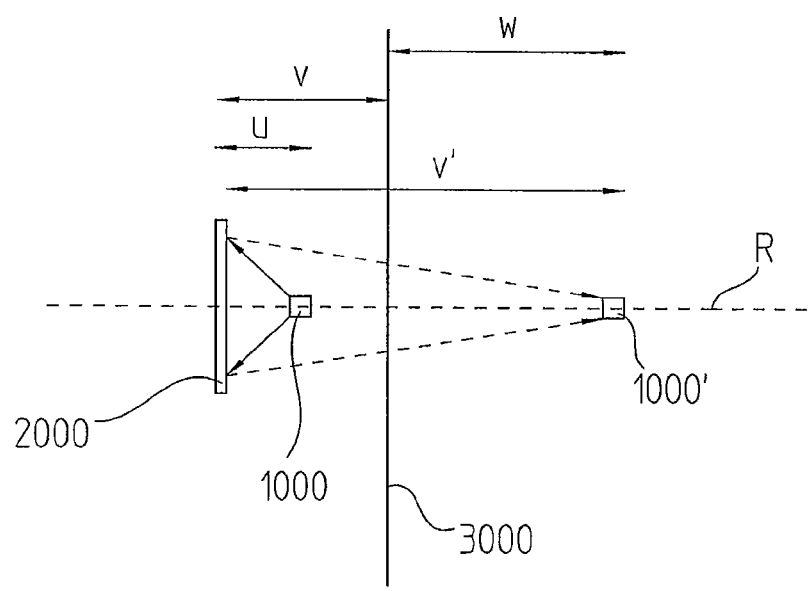
FIG. 5 shows a schematic fragmentary view of a second exemplary embodiment of a rotary position measuring instrument in accordance with the present invention.

Unlike the previous exemplary embodiment of FIG. 3, the optical effects of FIG. 5 are embodied in the graduated disk. The optical effects affect the projection of an image of the light source 1000 into a defined position, which has the third distance u' from the measuring standard 2000. While in the first exemplary embodiment of FIG. 3, a virtual projection of an image of the light source 100 was effected via the optical element acting as a concave mirror. Regarding the embodiment of FIG. 5, via the optical element provided in the graduated disk, is a real projection of the light source 1000 at the virtual light source image 1000'. In addition, the distance of the light source image 1000' from the detector assembly 3000 is equivalent to a fourth distance w, which is identical in magnitude to the second distance v between the measuring standard 2000 and the detector assembly 3000. The resultant third distance u' here is not, as in the previous exemplary embodiment, identical in magnitude to the second distance v. In this exemplary embodiment as well, the optical element acts as a concave mirror, but unlike the previous exemplary embodiment of FIG. 3, the focal length of the concave mirror is quantitatively less than the object distance in the projection of an image by the concave mirror.

Because of the resultant location of the virtual light source image 1000', as seen in FIG. 5, the beams emitted by the virtual light source image 1000' now pass first through the detector assembly 3000, then strike the measuring standard 2000, and finally, after reflection from the measuring standard 2000, are propagated convergently in the direction of the detector assembly 3000.

In this exemplary embodiment of FIG. 5, accordingly, the equality of the magnitudes of the second and third distances u, v is not ensured. Because of the central-projection scanning principle employed, the consequence in the event of possible changes in the scanning distance between the measuring standard 2000 and the detector assembly 3000 is changes in the size of the fringe pattern image that results in the detection plane. This aspect is not so critical in the present rotationally symmetrical projection of an image of the measuring standard into the detection plane, since even if the diameter of the fringe pattern image changes, the location of the transitions from light to dark in the fringe pattern image remains unchanged. Accordingly, an advantage of this exemplary embodiment proves not to be primarily the independence from fluctuations in the scanning distance, but the fact that there is a convergent beam path between the measuring standard 2000 and the detector assembly 3000. As a consequence, the structures of the measuring standard 2000 are projected in reduced size into the detection plane, and accordingly even smaller detector surfaces in the detector assembly 3000, compared to known systems of this kind, are sufficient. The result is once again an improved insensitivity to any soiling on the scanned measuring standard 2000.

Besides the exemplary embodiments described, it is understood that still other modifications are possible within the scope of the present invention.

I claim:

1. A rotary position measuring instrument, comprising:
a light source;
a graduated disk comprising a rotationally symmetrical, reflective measuring standard; and
an optoelectronic detector assembly, wherein said graduated disk is rotatable relative to said light source and said detector assembly about an axis of rotation, wherein in case of relative rotation, rotary-angle-dependent position signals are detectable via said detector assembly;
wherein said light source is spaced apart from said measuring standard on said axis of rotation by a first distance, and said detector assembly is disposed at a second distance from said measuring standard, wherein said second distance is different in magnitude than said first distance; and
wherein said graduated disk comprises an optical element, which has an optical effect that results in a projecting an image of said light source into a position which has a third distance from said measuring standard, wherein said third distance is different in magnitude than said first distance.

2. The rotary position measuring instrument according to claim 1, wherein said third distance is identical in magnitude to said second distance.

3. The rotary position measuring instrument according to claim 1, wherein said optical element has an optical effect which is equivalent to an optical effect of a concave mirror having a defined focal length.

4. The rotary position measuring instrument according to claim 3, wherein via said optical element a real projection of an image of said light source is present at a position such that beams of light emitted from said position first pass through said detector assembly, then strike said measuring standard so as to be reflected therefrom, wherein said beams reflected from said measuring standard are propagated convergently in a direction towards said detector assembly.

5. The rotary position measuring instrument according to claim 1, wherein said optical element has an optical effect that is equivalent to an optical effect of a convex mirror having a defined focal length.

6. The rotary position measuring instrument according to claim 1, wherein said measuring standard is a radial graduation that comprises circular-annularly disposed graduation regions that have different reflection properties.

7. The rotary position measuring instrument according to claim 1, wherein highly reflective graduation regions are on the graduated disk so as to cause said optical effect on the incident beams to occur.

8. The rotary position measuring instrument according to claim 1, wherein said optical element comprises rotationally symmetrical graduated structures on a carrier substrate of said graduated disk.

9. The rotary position measuring instrument according to claim 1, wherein said light source fully illuminates said measuring standard without interposed optical components.

10. The rotary position measuring instrument according to claim 1, wherein said detector assembly comprises a circular-annular detector array, which comprises a plurality of detector elements disposed circular-annularly around said axis of rotation.

* * * * *